Patented Apr. 3, 1945

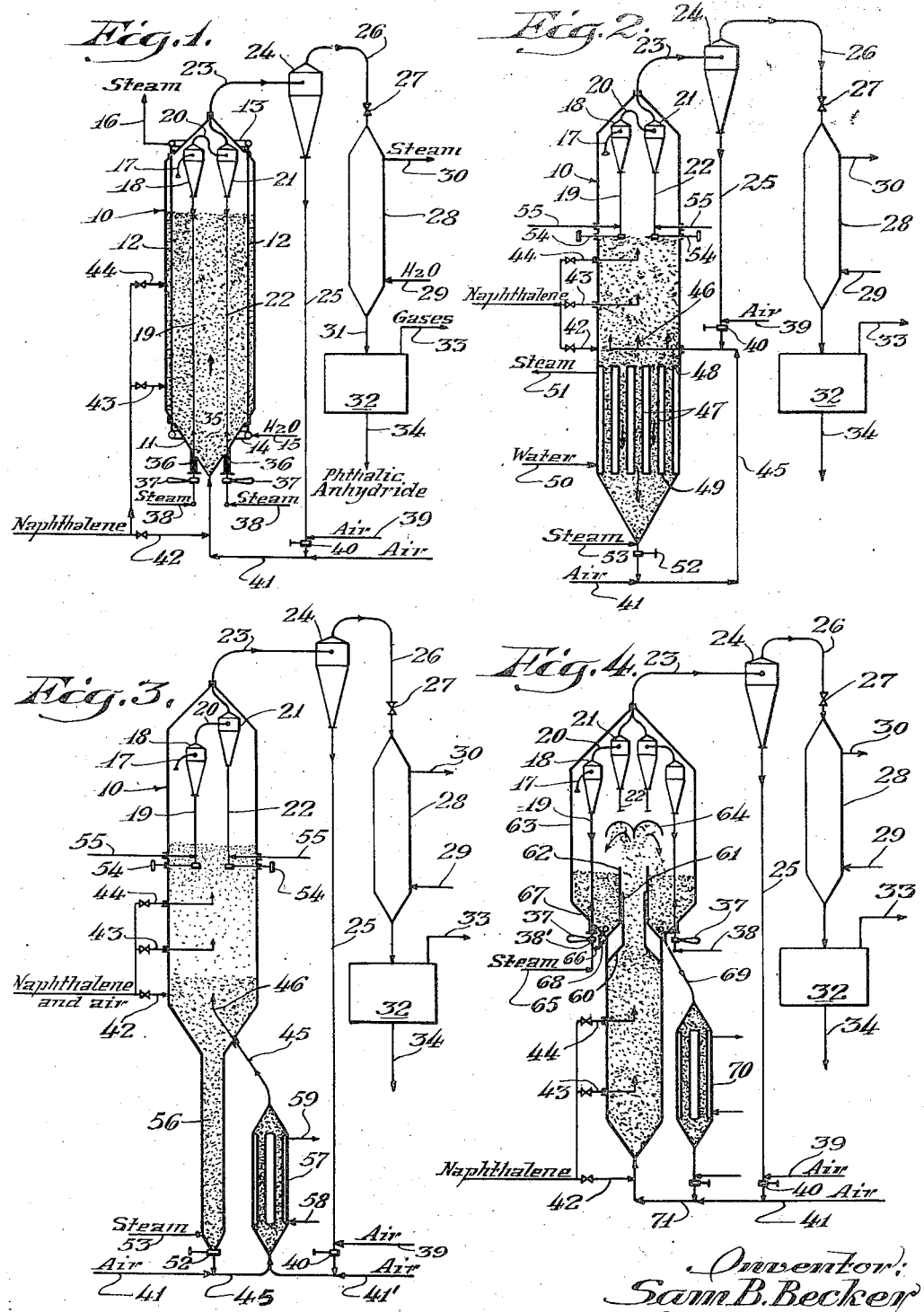

2,373,008

UNITED STATES PATENT OFFICE 2,373,008

OXIDATION OF ORGANIC COMPOUNDS AND MANUFACTURE OF PHTHALIC ANHYDRIDE

Sam B. Becker, Chicago, Ill., assignor to Standard Oil Company, Chicago, Ill., a corporation of Indiana Application June 27, 1941, Serial No. 400,134

10 Claims. (Cl. 260—342)

This invention relates to the manufacture of phthalic anhydride and it pertains more particularly to an improved method and means for effecting the oxidation of naphthalene and alkyl naphthalenes. The invention is applicable to similar reactions involving oxidation and chemical synthesis.

An object of my invention is to provide an improved method and means for removing heat developed by the oxidation of naphthalene hydrocarbons to phthalic anhydride and to obtain a closer temperature control in such reactions than has heretofore been possible.

A further object of the invention is to provide an improved method and means for converting oil refinery by-products containing large quantities of alkyl naphthalenes into phthalic anhydride.

A further object is to decrease the cost of manufacturing phthalic anhydride and to increase the yields of this compound obtainable from crude naphthalene or alkyl naphthalene charging stocks. Other objects of the invention will be apparent as the detailed description thereof proceeds.

In practicing my invention I effect the oxidation of the naphthalene hydrocarbons by means of a finely divided solid or powdered catalyst which is maintained in turbulent dense phase suspension in the air which promotes the oxidation. A uniform temperature prevails throughout the entire zone occupied by turbulent dense phase suspended catalyst particles and "hot spots" and local overheating are entirely avoided. Heat may be abstracted from the oxidation zone by means of suitable heat exchangers provided that the heat exchange surfaces do not interfere with the turbulent catalyst phenomena exhibited by dense phase suspended catalyst with critically controlled gas velocities. In order to insure against any interference with the turbulent catalyst phenomena I may separate catalyst from the turbulent zone, pass the separated catalyst through a cooler and reintroduce the cooled catalyst into the turbulent zone so that the catalyst itself acts as a heat absorber and heat carrier for transporting the heat of oxidation from the reaction zone to a separate cooling zone.

The separated catalyst which is thus recycled through a cooler is maintained in fluent form by means of aeration so that it may be handled as a liquid throughout its entire cycle. The continual introduction of this cooled catalyst into the dense turbulent suspended catalyst phase effects a remarkably sensitive temperature control. I may either regulate the extent to which the recycle catalyst is cooled or the amount of catalyst which is recycled through the cooler, or both.

It is important in powdered catalyst systems of this type to avoid losses of catalyst with reaction vapors and one feature of my invention is the provision of cyclone separators above the reaction zone for recovering any catalyst particles which would otherwise leave this zone with reaction products. This separated catalyst may be returned directly to the turbulent dense phase of suspended catalyst in the reaction zone.

The turbulent dense phase suspended catalyst phenomena has been most conclusively demonstrated in connection with powdered solids having a particle size of about 10 to 100 microns, i. e., particles of about 200 to 400 mesh or finer. Such solids in settled or compacted state may have a bulk density of about 35 to 40 pounds per cubic foot. When subjected to mild aeration with gas velocities of about .05 to .5 foot per second these solids behave as a liquid with a bulk density of about 25 or 30 pounds per cubic foot. When the vertical velocity of the gas is about 1 to 3 feet per second, particularly about 1½ to 2½ feet per second the catalyst becomes suspended in a turbulent dense phase or mass having a bulk density of about 10 to 20, for example about 15 pounds per cubic foot. Catalyst particles may be carried upwardly and beyond this dense phase by the ascending gases into a dispersed catalyst phase and catalyst may settle from the bottom of this turbulent dense phase zone below the point of gas inlet. In the dense turbulent zone itself it appears that the gases pass upwardly at a fairly uniform velocity while the suspended catalyst particles are constantly cascading from top to bottom and being transported from bottom to top, so that there is a substantially uniform catalyst distribution throughout the entire zone. Cooled catalyst which is introduced into this zone is dispersed almost instantaneously throughout the entire zone and the temperature at any point in this zone is almost identically the same as the temperature at any other point. In many cases a determinable interface exists between the suspended catalyst in this turbulent dense phase condition and the catalyst carried by gases to the dispersed phase above the dense phase zone. A feature of my invention is the utilization of this turbulent dense phase suspended catalyst phenomena for effecting the oxidation of naphthalene hydrocarbons into phthalic anhydride. The dense turbulent suspended catalyst phase as hereinabove described may likewise be defined as being a dense turbulent mass of suspended catalyst particles or simply as a turbulent mass of catalyst particles.

The invention will be more clearly understood from the following detailed description read in conjunction with the accompanying drawing which forms a part of this specification and in which similar parts are designated by like reference characters in the several modifications. Each figure of the drawing is a schematic or diagrammatic representation of an oxidation reactor illustrating means for returning catalyst from the light dispersed phase to the dense phase. More specifically:

Figure 1 illustrates a modification wherein the heat removal zone is in the reactor itself and at the periphery thereof;

Figure 2 illustrates a modification wherein the heat removal zone is in the reactor itself but at the base thereof;

Figure 3 illustrates a system wherein an upflow heat removal zone is positioned outside of the reactor; and Figure 4 illustrates a modification wherein a down-flow heat removal zone is located outside of the reactor.

As a charging stock for my process I may employ "hot pressed" or contrifuged naphthalene from coal tar, i. e., a grade of naphthalene having a melting point of about 77 to 79° C. (pure naphthalene melts at 80° C.). A feature of my invention, however, is the utilization of petroleum refinery by-products and particularly the refractory stocks produced by thermal or catalytic cracking or reforming. In thermal or catalytic cracking processes for the production of gasoline from gas oils and heavier hydrocarbons one of the by-products is a refractory stock which may boil at about 400 to 550° F. and which is characterized by a large content of alkyl naphathalene. The alkyl naphthalene content of such refractory stock may be further concentrated by recycling to the cracking step or further cracking in a separate cracking step or by extraction with selective solvents for the removal of paraffinic hydrocarbons.

An important source of naphthalene and alkyl naphthalenes is the refractory stock produced in a process of catalytically converting a low knock rating naphtha into high octane motor fuel by contacting the naphtha vapors with a catalyst such as molybdenum oxide, chromium oxide or vanadium oxide supported on active alumina, the contacting being effected at temperatures of about 900 to 1000° F., pressures of about 50 to 450 pounds per square inch, space velocities of about .2 to 2.0 volumes of liquid feed per volume of catalyst space per hour, said reaction being effected in the presence of hydrogen or recycle gas containing hydrogen. This process is referred to as hydrocatalytic reforming or hydroforming or dehydroaromatization. The heavier-than-gasoline fraction which is produced in this reaction is a refractory stock sometimes referred to as "reformate polymer" and it may have an A. P. I. gravity of about 11, a distillation range of about 450 to 600° F., a refractive index ($N_D^{20}$) of 1.591 and a specific dispersion of 264. This refractory stock contains large quantities of alkyl polycyclic aromatic hydrocarbons such as alkyl naphthalenes. The alkyl naphthalenes may be further concentrated by solvent extraction or distillation, or both, for example, an 8 to 16% fraction obtained by distillation may have a distillation range of about 440 to 490° F., an A. P. I. gravity of about 17, a refractive index of about 1.558 and a specific dispersion of about 224. A feature of my invention is the use of such by-product "refractory stocks" produced in petroleum refining processes for the production of phthalic anhydride.

As catalysts for my process I may employ 6th or 7th group metal oxides either unsupported or supported on suitable carriers such as alumina, silica gel, pumice, kieselguhr, or any other known catalyst supports. Activated alumina or silica gel may be impregnated with ammonium vanadate or ammonium molybdate or both and then dried and heated to about 900 to 1000° F. Silica hydrogel may be ball-milled with vanadium oxide, molybdenum oxide or other catalytic oxides and the resulting dough dried and heated as in the previous example.

In the following example I will describe a system for employing a catalyst consisting of a mixture of vanadium and chromium oxides supported on active alumina or silica gel but it should be understood that the invention is not limited to any particular catalyst composition or preparation. If more active catalysts such as tin vanadate are employed, the oxidation temperatures should be lower than set forth in the following examples because of the higher catalyst activity. By using the vanadium oxide or molybdenum oxide catalysts on relatively inert supports the reaction may be more easily controlled, particularly when the catalyst itself acts as a heat absorber and heat carrier as will be hereinafter described. I may use a finely divided or powdered catalyst having a particle size of about 10 to 100 microns and containing about 2 to 20% of vanadium oxide and molybdenum oxide respectively. I will describe the use of such catalyst in a plant designed to produce about 2000 to 3000 pounds per day of phthalic anhydride from naphthalene or by-product petroleum refractory stocks.

The simplest system for practicing my invention is illustrated in Figure 1 wherein I provide cylindrical reactor 10 about 3 feet in diameter and about 5 to 10 feet high. The reactor is provided with a cone-shaped bottom 11 the sides of which are relatively steep (i. e., about a 60 degree slope) so that the air which is introduced at the base of the cone-shaped bottom will sweep any catalyst particles therefrom and prevent substantial catalyst deposition. About 250 to 500 pounds or more of finely divided catalyst are placed in this reactor depending on catalyst activity and on space velocities to be employed in the reactor.

Around the periphery of the reactor I employ substantially vertical tubes 12, which extend through the top and bottom reactor walls to upper header 13 and lower header 14. Water may be introduced into the lower header through line 15 and steam withdrawn from the upper header through line 16 suitable provisions being employed for regulating the pressure of the generated steam and regulating the water level in tubes 12.

In or above the top of the reactor I provide cyclone separators for removing catalyst particles from the gases leaving the reactor. Thus gases from the top of the reactor may be introduced by inlet pipe 17 to primary cyclone 18 which is provided with a dip leg 19 extending to the lower part of the reactor. Gases from the primary cyclone are introduced by line 20 to secondary cyclone 21 which is provided with dip leg 22. Gases from the secondary cyclone may be passed through one or more additional internal cyclone stages or they may be withdrawn through line 23 to external catalyst separation means 24 which may be additional cyclone separators or may be an electrostatic precipitator or other conventional separation means. Catalyst from this external separator is returned to the system through line 25.

The catalyst-free reaction products are then passed through line 26 and pressure reduction valve 27 to heat exchanger 28 which may be a waste heat boiler for generating 15 pound process steam, the water being introduced into the exchanger through line 29 and the steam being withdrawn through line 30. The cooled gases and reaction products are then introduced through line 31 into separation chamber 32 from which gases are withdrawn through line 33 and the crude phthalic anhydride is periodically or continuously removed by line 34 or by any other conventional means. The specific method of fractionating the reaction products forms no part of the present invention and it will, therefore, not be described in further detail. Relatively pure phthalic anhydride may be separated from any unreacted naphthalene and from other conversion products by conventional processes of fractional sublimation, distillation, crystallization, etc.

Settled catalyst in dip legs or pipes 19, 22 and 25 must be maintained in fluent condition to avoid plugging or bridging. The internal dip legs may terminate above closure members 35 mounted on hollow stems 36 extending through the bottom wall to external operating means 37 and a gas such as steam or air may be introduced through line 38 and discharged from the upper part of closure member 35 through suitable vents for dispersing catalyst into the reactor when the closure is in open position, and for aerating or blowing out the dip legs when the closure members are in their upper closed position against the bottom of the dip legs. Similarly catalyst in pipe 25 may be aerated by air or steam introduced by line 39 and may be discharged into pipe 41 in amounts regulated by valve 40.

Air is introduced through line 41 at a pressure of about 15 to 20 pounds per square inch and in amounts of about 1000 to 3000, for example about 2000 pounds per hour (about 25,000 cubic feet per hour measured at standard conditions of temperature and pressure). This air picks up catalyst from the base of pipe 25 and introduces it at the base of reactor 10 wherein it likewise suspends the catalyst returned to the base of the reactor through dip legs 19 and 22.

Naphthalene vapors may be introduced with the air in line 41 or may be introduced into the reactor at various levels through pipes 42, 43 or 44, the naphthalene charge being about 100 to 150, for example about 125 pounds per hour. Prior to the introduction of naphthalene vapors the reactor may be brought to reaction temperature by burning a gaseous fuel therein, by passing hot flue gases therethrough or by any other conventional means.

The reaction temperature will depend upon the specific catalyst and may range from about 500 to 1000° F. or more but with the vanadia-chromia catalyst I prefer to employ temperatures of about 900 to 960° F., for example about 930° F. The oxidation of naphthalene to phthalic anhydride liberates a considerable amount of heat and the burning of alkyl side chains from alkyl naphthalenes liberates even greater amounts of heat. If "hot spots" or local overheating occurs in the reaction zone the oxidation will go too far with the production of decreased yields of phthalic anhydride and increased yields of carbon dioxide. An important feature of my invention is the method of heat removal and temperature control for obtaining maximum yields of valuable products.

Under the reaction conditions above stated the vertical gas velocity in the reactor will be about 1 to 3, for example, about 2 feet per second. At such vertical gas velocities the catalyst will be maintained in the turbulent dense phase suspended condition so that substantially identical temperatures prevail throughout the entire reactor. The heat which is liberated in the reaction generates steam in pipes 12 and the turbulent motion of the catalyst in the reactor carries the heat from the main body of the reaction zone to the heat exchange surfaces which surround the reactor. Remarkably close temperature control may thus be provided by regulating the pressure at which steam is generated in pipes 12.

The contact time in the reactor may range from about 1 to 4 seconds depending upon the point in the reactor at which the naphthalene vapors are introduced. With the particular catalyst employed a contact time of about 2 or 3 seconds should result in excellent conversions. Catalyst is continuously removed from gases and vapors leaving the top of the reactor and this removed catalyst is continuously re-introduced into the dense turbulent catalyst suspension. The pressure on the reaction gases and vapors may be reduced to about atmospheric in valve 27 so that the recovery system operates at normal atmospheric pressure.

In Figure 2 I have illustrated a system wherein the heat removal zone is in the base of the reactor instead of around the sides thereof. In this case reactor 10 may be about 15 or 20 feet high so that there will be an upper reaction zone about 10 feet in height and a lower cooling zone of approximately equal height. The air introduced through line 41 picks up catalyst from the base of the cooling section and carries it by line 45 to distributing means 46 above the cooling zone. Cooling coils 47 are mounted between upper header 48 and lower header 49. Water may be introduced around these tubes through line 50 and steam may be withdrawn through line 51. The catalyst which separates out of the turbulent dense phase in the upper part of the reactor will flow downwardly through tubes 47 and be introduced into line 45 in amounts regulated by valve or star feeder 52. The settled catalyst in the base of the reactor and in tubes 47 is maintained in fluent form by the introduction of aeration gas such as steam or air through line 53.

The dip legs on the internal cyclone separators need not extend to the base of the reaction zone but may extend only to the turbulent dense phase reaction zone. Flow of catalyst through these dip legs may be regulated by externally controlled valves 54 and aeration gas may be introduced into the dip legs through line 55. The dip legs should in any case be long enough so that the pressure head of catalyst therein will balance the difference in pressure in the top of the reactor and the pressure in the cyclones respectively. Thus, if the top of the reactor is at a pressure of 15 pounds the pressure in primary cyclone 18 may be about 14.6 pounds and the pressure in secondary cyclone 21 may be about 14.2 pounds.

With about 500 pounds of catalyst in the reactor it may be necessary to remove about 20 B. t. u. of heat per hour per pound of catalyst for each pound of naphthalene oxidized and this heat removal may be accomplished by regulating the rate at which catalyst is recycled through cooling tubes 47 and returned to the reaction zone, or by varying the amount of cooling which is effected in tubes 47, or both. An extremely sensitive temperature control is effected by continuously recycling catalyst through a cooler and then continuously resuspending the cooled catalyst in the dense phase turbulent reaction zone because of the substantially instantaneous dispersion of the cooled catalyst throughout the entire volume of the reaction zone. The catalyst itself thus acts as a heat absorber and a heat carrier for picking up the liberated heat and carrying it to a point outside of the reaction zone.

In Figure 3 I have illustrated a system wherein the cooling zone is entirely outside the reactor and the catalyst is recycled in an upflow air stream through this cooling zone before it is reintroduced into the reactor. In this case a standpipe 56 may be employed at the base of the reactor in order to provide the necessary head of catalyst for insuring a positive feed of catalyst from valve 52 into line 45. The catalyst in the standpipe may be aerated by steam or air introduced through line 53 as in previous examples and additional aerating gas may be introduced at the base of the reactor above the top of the standpipe. The catalyst picked up by air from line 41 is carried through the tubes of cooler 57. Around these tubes water may be introduced through line 58 for the generation of steam, which is removed through line 59. If external catalyst separation means are employed, the catalyst from pipe 25 may be picked up with air from line 41' and passed to the cooler en route to the reaction zone.

In this modification catalyst will separate from the base of the dense turbulent zone and be cooled and reintroduced into the turbulent zone with incoming air. Catalyst particles which leave the top of the turbulent zone are separated from gases and vapors and likewise returned to the turbulent zone. The specific point of catalyst introduction into the turbulent zone is immaterial since catalyst is uniformly mixed and distributed throughout this entire zone.

In a modification illustrated in Figure 4 I have shown a system wherein catalyst is removed from the top of the reaction zone, recycled through a cooler and introduced at the base of said zone with incoming air. In this modification reactor 10 will be of substantially the same size and shape as the reactor illustrated in Figure 1 but I may provide a movable false top 60 for effectively varying the reactor volume and, therefore, the gas or vapor contact time in the reactor. This false top may be connected to a conduit 61 which is slidably mounted in conduit 62 and which may be positioned by external control means (not shown) to regulate the effective reactor volume.

Superimposed above the reactor in Figure 4 is an enlarged separation chamber 63, the space between the walls of this chamber and conduit 62 forming an upper hopper for separated catalyst. The suspended catalyst which is carried out of the reactor through conduit 62 impinges against baffle 64 which deflects the catalyst particles downwardly and permits the gases and vapors to pass upwardly and through the cyclone separators. Steam or air may be introduced through line 65, a part of it passing through line 38' for aerating the cyclone separator dip legs, a part through line 66 for introduction at the base of the upper hopper to distributing means 67 for effecting aeration of catalyst in the hopper, and a part through line 68 for maintaining a positive pressure between false head 60 and the top of the reactor (i. e., a pressure which is greater than the pressure in the reactor).

Catalyst from the upper hopper flows downwardly through line 69 through cooler 70 and is picked up by air from line 41 and returned to the base of the reactor through line 71.

In all of the above examples the catalyst in the reaction zone is maintained in dense phase turbulent suspension and the catalyst itself picks up the heat from the main portion of the reaction zone and conveys that heat to a separate cooling zone which may be either in the reactor itself or outside of the reactor.

While the process has been described for the preparation of phthalic anhydride from naphthalene it should be understood that the temperatures, catalysts, oxygen concentrations and operating conditions may be varied throughout a fairly wide range in order to effect any desired extent of oxidation. Thus under proper conditions I may produce substantial amounts of alpha-naphthaquinone which, in turn, may be further oxidized to maleic anhydride. The phthalic anhydride may be further oxidized to benzoic acid. Naphthols are difficult to obtain because the presence of a hydroxyl group on the naphthalene ring greatly increases its activity toward oxygen, but under carefully controlled conditions even naphthols may be produced.

In the above description no special mention has been made of particular methods for vaporizing the naphthalene charging stock but it should be understood that naphthalene may be vaporized in suitable coil heaters and introduced into the reactor at or below reaction temperature or it may be vaporized by bubbling primary air through molten naphthalene and mixing secondary air with the vapors en route to the reactor. By separately vaporizing the naphthalene and introducing it at the proper level in the reactor I may control the contact time and thus determine the extent of oxidation which is effected. A feature of my invention is the much larger yields of valuable oxidation products and lower yields of carbon dioxide than were obtainable in processes heretofore employed.

I have described the use of a powdered catalyst of about 200 to 400 mesh, but it should be understood that larger particle sizes may be employed if the vapor velocities in the reactor are properly modified to maintain the desired turbulent dense phase suspension. In any event, it is important to keep the catalyst in fluent form not only in the reaction zone itself but in the catalyst coolers, standpipes and recycling systems.

While I have described in detail certain preferred embodiments of my invention as applied to a particular process, it should be understood that my invention is not limited to the specific systems nor to the specific operating conditions hereinabove set forth since numerous modifications and alternative procedures and conditions will be apparent to those skilled in the art from the above description. In a copending continuation-in-part of this application, Serial 578,310, filed February 16, 1945, I am claiming the specific embodiment of the herein disclosed invention wherein the heat exchange surfaces are positioned in the dense catalyst phase of the oxidation zone, the invention herein claimed being directed to embodiments wherein catalyst is downwardly withdrawn from the oxidation zone in the form of an aerated column, cooled, and returned to the oxidation zone.

I claim:

1. The method of oxidizing a vaporizable organic material under controlled temperature conditions which method comprises suspending a powdered oxidation catalyst in an upflowing stream of an oxidation gas of which the vertical velocity is such as to maintain the suspended catalyst in the form of a dense turbulent mass of catalyst particles in a reaction zone, introducing organic material into said dense turbulent mass of suspended powdered catalyst and passing vapors of said material upwardly therethrough, separating catalyst particles from gases and vapors leaving the upper part of the reaction zone, returning the separated catalyst particles to the reaction zone, downwardly withdrawing the catalyst directly from the dense turbulent mass thereof in the form of an aerated column, introducing an aeration gas at a low point in said column, suspending catalyst from the base of said column in a carrier gas, cooling said catalyst while suspended in said carrier gas and returning said cooled catalyst by means of said carrier gas to the dense mass of suspended catalyst in the rection zone.

2. The method of claim 1 wherein the vaporizable organic material is a naphthalene hydrocarbon.

3. The method of claim 1 wherein the vaporizable organic material is a refractory hydrocarbon by-product of a petroleum refining process and wherein said hydrocarbon boils within the approximate range of about 400° to 550° F. and contains substantial amounts of alkyl naphthalene.

4. The method of oxidizing a vaporizable organic material under controlled temperature conditions which method comprises suspending a solid oxidation catalyst having a particle size within the range of 10 to 100 microns in a stream of oxidizing gas, introducing the resulting suspension into an oxidation zone at a low level therein, passing said gas upwardly through the oxidation zone at such vertical velocity in the range of about 1 to 3 feet per second as to maintain the catalyst in dense phase turbulent suspension therein, introducing a vaporizable organic material into said turbulent dense catalyst phase and passing vapors and reaction products of said material along with the oxidizing gas upwardly through dense phase catalyst material in the oxidation zone at oxidation temperature, separating catalyst particles from gases and vapors leaving the upper part of the oxidation zone, cooling said last-named gases and vapors, returning separated catalyst particles to the oxidation zone, withdrawing catalyst from the oxidation zone as a downwardly moving column, introducing a gas into said column to maintain the catalyst therein in aerated condition, discharging catalyst from the base of said column into the stream of oxidizing gas which is introduced to said oxidation zone, and cooling by indirect heat exchange the catalyst withdrawn as a column from the oxidation zone before said withdrawn catalyst is returned thereto whereby the temperature in the oxidation zone is maintained at a substantially constant level.

5. The method of claim 4 which includes the step of withdrawing catalyst from the oxidation zone at a lower level in said zone than the level at which the suspension of catalyst in oxidizing gas is introduced thereto.

6. The method of oxidizing a vaporizable organic material under controlled temperature conditions which method comprises dispersing a solid oxidation catalyst of small particle size in a stream of an oxidizing gas, introducing said stream at a low level in an oxidation zone, passing gases upwardly in the oxidation zone at a sufficiently low velocity to maintain the catalyst in suspended dense turbulent phase, introducing a vaporizable organic material into said dense turbulent phase of suspended catalyst, passing vapors of said material together with oxidizing gas and oxidation products upwardly through suspended, turbulent dense phase catalyst in said oxidation zone at an oxidation temperature, separating catalyst particles from gases and vapors leaving the upper part of the oxidation zone, cooling the last-named gases and vapors, returning separated catalyst particles to dense phase suspended catalyst, withdrawing catalyst directly from said dense phase suspended catalyst as a downwardly moving column, introducing a gas into said column for maintaining the catalyst therein in aerated condition, discharging catalyst from the base of said column into the stream of oxidizing gas which is introduced into the oxidation zone, and abstracting a sufficient amount of heat from the catalyst withdrawn as a downwardly moving column after it is withdrawn from said dense phase and before it is returned to the oxidation zone to maintain a substantially constant temperature level in said oxidation zone.

7. The method of oxidizing a vaporizable organic material under controlled temperature conditions which method comprises subjecting a solid oxidation catalyst of small particle size in an upflowing stream of an oxidizing gas in an oxidation zone maintained at oxidation temperature, employing an upward gas velocity in said oxidation zone sufficiently low to maintain the suspended catalyst in the form of a dense turbulent mass of catalyst particles, introducing a vaporizable organic material into said dense turbulent mass of suspended catalyst for contact therewith along with upflowing oxidizing gas, separating catalyst particles from gases and vapors leaving the upper part of the oxidation zone, returning the separated catalyst particles to the reaction zone, withdrawing catalyst as a vertical downwardly moving column from a level in said oxidation zone below the level at which organic materials are introduced thereto, introducing a gas into said column for maintaining the catalyst therein in aerated condition, suspending catalyst from the base of said column in a carrier gas and returning it with said carrier gas to the oxidation zone and cooling said catalyst withdrawn as a downwardly moving column subsequent to its withdrawal from the oxidation zone and prior to its return thereto for maintaining a substantially constant temperature level in said oxidation zone.

8. The method of claim 4 wherein the vaporizable organic material is a naphthalene hydrocarbon.

9. The method of claim 6 wherein the vaporizable organic material is a naphthalene hydrocarbon.

10. The method of claim 7 wherein the vaporizable organic material is a naphthalene hydrocarbon.

SAM B. BECKER.